United States Patent [19]

Cornelissen et al.

[11] Patent Number: 5,184,974
[45] Date of Patent: Feb. 9, 1993

[54] METHOD AND DEVICE FOR DIVIDING A SLAUGHTERED BIRD INTO A FRONT HALF AND A BACK HALF

[75] Inventors: Albertus T. J. J. Cornelissen, Cuyk; Adrianus J. van den Nieuwelaar, Gemert, both of Netherlands

[73] Assignee: Stork PMT B.V., Boxmeer, Netherlands

[21] Appl. No.: 787,834

[22] Filed: Nov. 5, 1991

[30] Foreign Application Priority Data

Nov. 9, 1990 [NL] Netherlands ............... 9002458

[51] Int. Cl.⁵ ............................... A22C 21/00
[52] U.S. Cl. ........................... 452/160; 452/155
[58] Field of Search ............... 452/160, 149, 152, 155, 452/167

[56] References Cited

U.S. PATENT DOCUMENTS

| | | |
|---|---|---|
| 3,639,945 | 2/1972 | Duncan et al. |
| 4,557,015 | 12/1985 | Dodd . |
| 4,558,489 | 12/1985 | van Mil ............... 452/160 |
| 4,593,435 | 6/1986 | Martin et al. . |
| 4,815,168 | 3/1989 | van den Nieuwelaar et al. ............... 452/149 |
| 5,035,673 | 7/1991 | Hazenbroek ............... 452/149 |

FOREIGN PATENT DOCUMENTS 109708 5/1984 European Pat. Off. .
8602208 5/1988 Netherlands .

*Primary Examiner*—Willis Little
*Attorney, Agent, or Firm*—Hurt, Richardson, Garner, Todd & Cadenhead

[57] ABSTRACT

A method and device for transverse dividing of a slaughtered bird, in which the carcass of the bird hanging by the legs in a conveyor is moved along with the breast in the direction of conveyance, the method comprising the steps of: placing the bird in an oblique position relative to the conveyance direction in such a way that the legs are in front of the rest of the carcass, viewed in the conveyance direction; bringing down the chest relative to the legs by exerting an essentially downward directed force on both sides thereof, so that the plane in which the transverse dividing operation takes place lies below the thighs and above the chest; and dividing the bird into a back half hanging from the conveyor and a front half. Prior to the dividing operation, the skin is cut through along the top edge of the thighs adjoining the chest.

10 Claims, 2 Drawing Sheets

METHOD AND DEVICE FOR DIVIDING A SLAUGHTERED BIRD INTO A FRONT HALF AND A BACK HALF

BACKGROUND OF THE INVENTION

This invention relates to a method for transverse dividing of a slaughtered bird into a back half comprising the legs and a part of the back, and a front half in which the ribs are situated, comprising the breast and the remainder of the back, in which the carcass of the bird hanging by the legs in a conveyor is moved along with the breast in the direction of conveyance, comprising the steps of: placing the bird in an oblique position relative to the conveyance direction in such a way that the legs are in front of the rest of the carcass, viewed in the conveyance direction; bringing down the chest relative to the legs in such a way that the plane in which the transverse dividing operation takes place lies below the thighs and above the chest; and dividing the bird into a back half hanging from the conveyor and a front half. The invention also relates to a device for carrying out this method, provided with a frame which is disposed along a conveyor in which slaughtered birds can be moved along hanging by the legs with the breast in the conveyance direction, in which frame a cutting device is fitted in the path of the birds, and also guide means for taking the bird into an oblique position relative to the conveyor, in such a way that the legs are situated in front of the carcass, viewed in the conveyance direction, and positioning means for bringing down the chest relative to the legs in such a way that the plane in which the transverse dividing operation with the cutting device takes place lies below the thighs and above the chest.

DISCUSSION OF THE PRIOR ART

A method and a device for dividing a slaughtered bird into a front half and a back half are known from European Patent Specification 109,708. This publication describes how, for transverse dividing of the bird, the edge of the chest is pulled away from the legs prior to the dividing operation, in order to gain sufficient space for carrying out the dividing operation. For this purpose, the device is provided with a gripping element which is positioned in such a way that, after the bird is taken into an oblique position during conveyance in the conveyor, a hook-shaped end of said element grips behind the edge of the chest and exerts such a force thereon that the chest is moved away from the legs.

The use of a method in which the chest is moved down by gripping behind the edge of the chest makes it necessary to use a gripping element which has to be brought into the path of conveyance of the bird, moving along with the bird, and which has to move back to a starting position when it has fulfilled its function. The gripping element comprises a considerable number of parts, takes up a large amount of space, and is expensive. Further, in view of the number of moving parts, regular maintenance is necessary, and accidental blockages of the gripping element can occur due to the slaughter residues being carried along by the conveyor and ending up on the gripping element.

SUMMARY OF THE INVENTION

It is now a primary object of the invention to reduce substantially the afore-mentioned disadvantages by providing a method in which the chest of a bird moved along in a conveyor can be brought downwards in a simple manner for transverse dividing of the bird into a front and a back half.

This object is attained by bringing the chest down by exerting an essentially downward directed force on both sides thereof.

Prior to the cutting operation, the skin is preferably cut through along the top edge of the thighs adjoining the chest. By cutting through the skin at a given place one prevents that the skin comes away from the underlying meat over a large part of the carcass during the dividing operation. The skin thus remains covering the meat as much as possible, and also the membrane lying under the skin and not cut through, which prevents bacteriological contamination of the meat.

In a device according to the invention the positioning means are disposed downstream relative to the guide means and exert an essentially downward directed force on the sides of the chest.

In a preferred embodiment of the device according to the invention the positioning means are composed of two guides which run essentially parallel to each other and are provided adjustably below the conveyor in the path of the bird at the level of the chest, and are directed downwards at an acute angle to the conveyance direction, while the bird passes between the guides, and the distance between them is smaller than the transverse dimensions of the chest.

The downward directed part of the positioning means preferably comprises wing shield plates.

Advantageously, the guides are fixed by means of spring means in the frame, which spring means permit movements of the guides in a plane at right angles to the conveyance direction under the influence of forces exerted thereon by the bird. The spring means may be formed by two coaxial cylinders between which a deformable resilient material is fitted.

In a simple manner, the guide means are formed by two essentially horizontally disposed guides which are fitted adjustably below the conveyor in the path of the bird at the level of the region between the chest and the thighs, while the bird passes between the guides, and the guides, viewed in the conveyance direction, converge in such a way that the distance between them at the end is smaller than the transverse dimensions of the chest.

In a preferred construction, upstream relative to the positioning means, below the conveyor on either side of the path of the bird at the level of the region between the chest and the thighs, cutting means for cutting through the skin of the bird locally are provided.

For increased reliability of the device two horizontal guides are fitted below the conveyor for guiding the hips of the bird above the cutting device during the transverse dividing operation.

The claims and advantages will be more readily appreciated as the same becomes better understood by reference to the following detailed description and considered in connection with the accompanying drawings in which like reference symbols designate like parts.

DESCRIPTION OF THE PREFERRED EMBODIMENT

Figure 1:
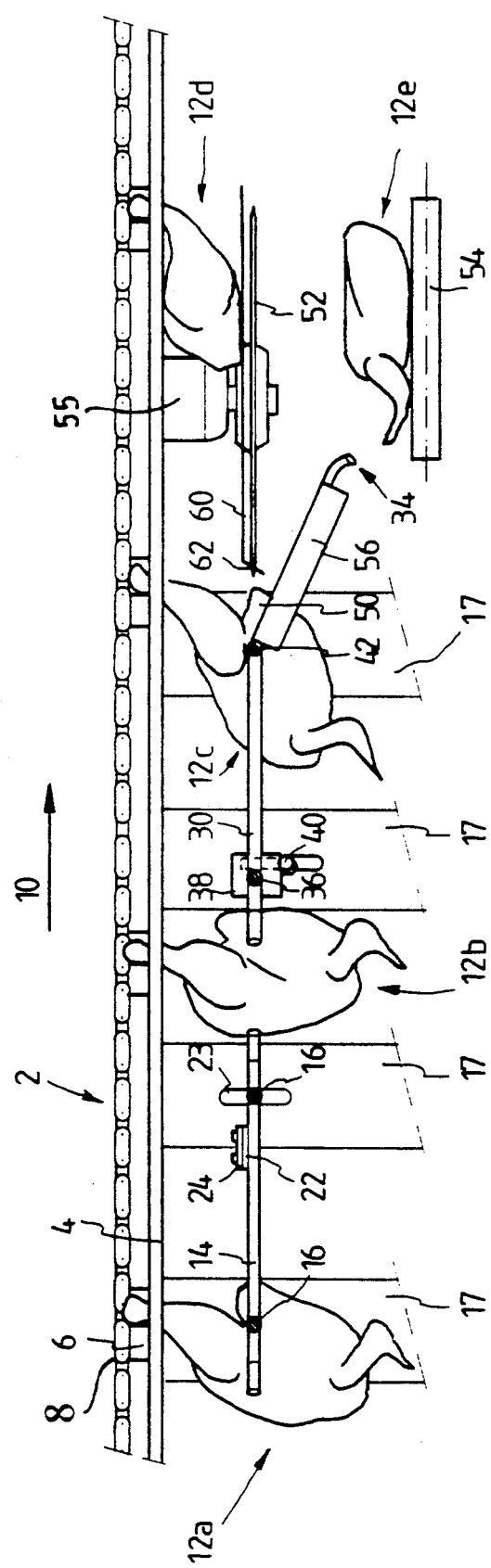
FIG. 1 shows a side view, partially in cross-section, of a part of a embodiment of the device according to the invention in which birds are being moved along.

FIG. 1 shows a part of a conveyor 2 comprising two parallel, elongated rails 4. only one of which is shown. Conveyor elements 6, which are interconnected and are moved along by means of a chain 8, slide along the rails 4. The conveyor elements 6 are provided with two recesses in which the legs of a slaughtered bird can be confined by the tarsal joints against the rails 4. The birds are conveyed by means of the conveyor elements 6 in the conveyor 2 in the direction of the arrow 10.

Figure 2:
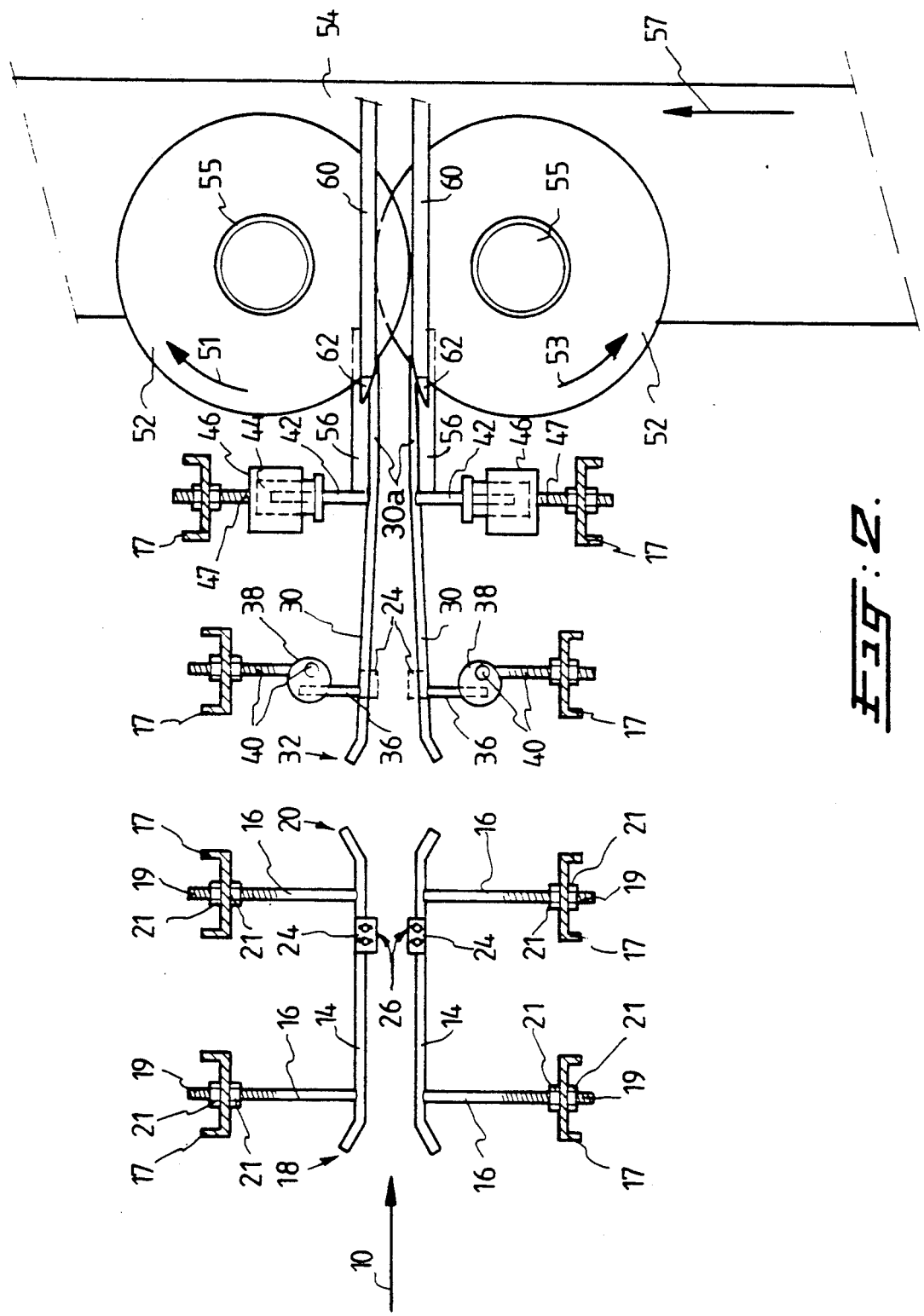
FIG. 2 shows a top view of the device of FIG. 1, as mounted in a processing line leaving out the conveyor and the birds.

As FIGS. 1 and 2 show, first of all, viewed in the direction of conveyance 10, two guides 14 running essentially parallel, which by means of bars 16 are adjustable in height and as regards spacing between them, are provided below the conveyor 2 in a part of a frame 17. In order to make the adjustability possible, the bars 16 are provided, at the end facing away from the guides 14, with screw thread 19 along which nuts 21 can be turned. The frame parts 17 are provided with vertically directed slip holes 23. The distance between the guides 14 and the conveyor 2 is set in such a way that a bird 12a of a predetermined type and size passes the guides 14 at the level of the region between the thighs and the chest. The distance between the guides 14 is essentially equal to the transverse dimensions of the chest. The guides 14 are provided with a converging inlet part 18 and a diverging outlet part 20. Near the outlet part 20 two cutters 24 are fixed by means of bolts on two cutter holders 22 fitted on the guides 14, the cutting edges 26 of which cutters face each other. When a bird 12a is moved by the conveyor 2 between the guides 14, the cutters 24 make an incision on both sides of the bird 12a through the skin at the place where the thighs join the chest. Viewed in the conveyance direction 10, guides 30 are disposed downstream of the guides 14, at virtually the same distance from the conveyor 2 as the guides 14. The guides 30 are provided with a converging inlet part 32 and a diverging outlet part 34, between which, viewed in the conveyance direction 10, they first of all run horizontally and converging to a spacing between them of less than the transverse dimensions of the chest, and then run downwards and parallel at an acute angle to the conveyance direction 10. Each guide 30 is connected at two places to a frame part 17: at the first place by means of a shaft 36, bearing block 38 and a right-angled shaft 40, and in the second place by means of a bar 42, rubber cylinder 44, bush 46 and bar 47. The fixing of the bars 40 and 47 in frame parts 17 is identical to that of the above-mentioned bars 16. The design of the fixing of the bars 30 makes it possible for in particular the oblique downward directed part thereof to be movable around an initial position at right angles to the conveyance direction 10 and to be self-adjusting relative to birds of slightly differing dimensions which have to be divided, due to the fact that the birds can press the guides away sideways. The distance between the guides 30 over the length of said guides is selected in such a way that a bird 12b which is being moved along in the conveyor 2 between the guides 30 will first assume an oblique position relative to the conveyance direction 10, due to the friction forces produced between the guides 30, in such a way that the legs are in front of the rest of the carcass, viewed in the direction of conveyance. Such an oblique position is assumed by the bird 12c. The bird 12c is situated at the beginning of the oblique downward directed part 30a of the guides 30, which guides 30a from this point exert a force in the downward direction on the sides of the chest, as a result of which the point 50 of the chest is positioned below the cutting plane of two rotary cutters 52 driven in opposite directions 51 and 53 to each other, each by a motor 55.

In order to prevent the wing stumps of the birds from coming into contact with the rotary cutters 52, the downward directed parts 30a of the guides 30 are provided with wing shield plates 56.

The forward movement of the bird in the conveyor 2 ensures that the bird is moved along the cutting edges of the cutters 52, as a result of which the bird is divided transversely into a back half 12d and a front half 12e. The back half 12d then follows its path along the conveyor 2, while the front half 12e falls down under the influence of gravity onto a conveyor belt 54 and is conveyed away by the latter in the direction of the arrow 57 for further processing.

In the embodiment shown, the cutters 26 are fitted on separate guides 14. It is, however, also possible to fit the cutters 24 on the guides 30 near the inlet part 32 thereof, for a more compact construction of the device. This last-mentioned position of the cutters is indicated by dashed lines in FIG. 2.

Two guide strips 60 are fitted above the cutters 52, in order to increase the accuracy of position of the transverse dividing operation if relatively large length differences occur between the birds to be divided. The strips 60 are provided with a downward curved inlet part 62 and guide the hips of a bird over the cutters 52. Supports of the guide strips 60, which supports can be designed in a way similar to that of the guides 16, for the sake of clarity are not shown in FIGS. 1 and 2.

While the invention has been described and illustrated in its preferred embodiment, it should be understood that departures may be made therefrom within the scope of the invention, which is not limited to the details disclosed herein.

What is claimed is:

1. A method for the transverse dividing of a slaughtered bird into a back half including the legs and a part of the back, and a front half in which the ribs are situated, including the breast and the remainder of the back, in which the carcass of the bird is hanging by the legs from a conveyor and is moved along with the breast forwardly directed in the direction of conveyance, comprising the steps of:
   prior to the transverse dividing thereof, placing the bird in an oblique position relative to the conveyance direction in such a way that the legs are in front of the rest of the carcass, viewed in the conveyance direction;
   prior to the transverse dividing thereof, bringing down the chest relative to the legs by exerting an essentially downward directed force on both sides thereof by moving the bird past positioning means having a spacing less than the transverse dimension of the chest of the bird for forcing the chest downward relative to the legs, so that the plane in which the transverse dividing operation takes place lies below the thighs and above the chest; and
   dividing the bird into a back half hanging from the conveyor and a front half.

2. A method according to claim 1, wherein, prior to the dividing operation, the skin is cut through along the top edge of the thighs adjoining the chest.

3. A device for dividing a slaughtered bird into a back half including the legs and a part of the back, and a front half including the breast and the remaining part of the back, as the bird is moved in a conveyance direction by a conveyor, the device comprising a frame which is disposed along the conveyor in which slaughtered birds can be moved along hanging by the legs with the breast in the conveyance direction, in which frame a cutting device is fitted in the path of the birds, and also guide means for taking the bird into an oblique position relative to the conveyor, in such a way that the legs are situated in front of the carcass, viewed in the conveyance direction, and positioning means disposed downstream relative to the guide means, the positioning means having a spacing less than the transverse dimension of the chest of the bird and located generally below the plane in which the transverse dividing operation takes place for bringing down the chest relative to the legs by exerting an essentially downward directed force on the sides of the chest, so that the plane in which the transverse dividing operation with the cutting device takes place lies below the thighs and above the chest.

4. A device according to claim 3, wherein the positioning means are composed of two guides which run essentially parallel to each other and are provided adjustably below the conveyor in the path of the bird at the level of the chest, and are directed downwards at an acute angle to the conveyance direction, while the bird passes between the guides, and the distance between them is smaller than the transverse dimensions of the chest.

5. A device according to claim 4, wherein the downward directed part of the positioning means comprises wing shield plates.

6. A device according to claim 4, wherein the guides are fixed by means of spring means in the frame, which spring means permit movements of the guides in a plane at right angles to the conveyance direction under the influence of forces exerted thereon by the bird.

7. A device according to claim 6, wherein the spring means are formed by two coaxial cylinders between which a deformable resilient material is fitted.

8. A device according to claim 3, wherein the guide means are formed by two essentially horizontally disposed guides which are fitted adjustably below the conveyor in the path of the bird at the level of the region between the chest and the thighs, while the bird passes between the guides, and the guides, viewed in the conveyance direction, converge in such a way that the distance between them at the end is smaller than the transverse dimensions of the chest.

9. A device according to claim 3, wherein upstream relative to the positioning means, below the conveyor on either side of the path of the bird at the level of the region between the chest and the thighs, cutting means for cutting through the skin of the bird locally are provided.

10. A device according to claim 3, comprising two horizontal guides which are fitted below the conveyor for guiding the hips of the bird above the cutting device during the transverse dividing operation.

* * * * *